(12) United States Patent
Darreon et al.

(10) Patent No.: US 12,287,440 B2
(45) Date of Patent: Apr. 29, 2025

(54) METHOD FOR MANUFACTURING A FLUX DETECTOR OF A FIRST AND A SECOND IONIZING RADIATION

(71) Applicants: CENTRE NATIONAL DE LA RECHERCHE SCIENTIFIQUE, Paris (FR); UNIVERSITE D'AIX MARSEILLE, Marseilles (FR); INSTITUT NATIONAL DE LA SANTE ET DE LA RECHERCHE MEDICALE, Paris (FR); INSTITUT PAOLI IRENE CALMETTES CENTRE REGIONAL DE LUTTE CONTRE LE CANCER, Marseilles (FR)

(72) Inventors: Julien Darreon, Marseilles (FR); Sree Bash Chandra Debnath, Marseilles (FR); Didier Tonneau, Marseilles (FR); Carole Fauquet, Marseilles (FR); Agnès Tallet, Marseilles (FR)

(73) Assignees: CENTRE NATIONAL DE LA RECHERCHE SCIENTIFIQUE, Paris (FR); UNIVERSITE D'AIX MARSEILLE, Marseilles (FR); INSTITUT NATIONAL DE LA SANTE ET DE LA RECHERCHE MEDICALE, Paris (FR); INSTITUT JEAN PAOLI & IRENE CALMETTES CENTRE REGIONAL DE LUTTE CONTRE LE CANCER, Marseilles (FR)

( * ) Notice: Subject to any disclaimer, the term of this patent is extended or adjusted under 35 U.S.C. 154(b) by 104 days.

(21) Appl. No.: 18/262,784

(22) PCT Filed: Jan. 24, 2022

(86) PCT No.: PCT/EP2022/051424
§ 371 (c)(1),
(2) Date: Jul. 25, 2023

(87) PCT Pub. No.: WO2022/161889
PCT Pub. Date: Aug. 4, 2022

(65) Prior Publication Data
US 2024/0241274 A1 Jul. 18, 2024

(30) Foreign Application Priority Data

Jan. 27, 2021 (FR) .................................... 2100745

(51) Int. Cl.
*G01T 1/28* (2006.01)
*G01T 1/20* (2006.01)

(52) U.S. Cl.
CPC . *G01T 1/28* (2013.01); *G01T 1/20* (2013.01)

(58) Field of Classification Search
CPC .................................. G01T 1/28; G01T 1/20
See application file for complete search history.

(56) References Cited

U.S. PATENT DOCUMENTS 3,825,787 A * 7/1974 Doolittle ............... H01J 29/385
313/527
5,675,151 A 10/1997 Oka et al.
(Continued)

FOREIGN PATENT DOCUMENTS

| EP | 0 703 469 A2 | 3/1996 |
|---|---|---|
| WO | WO 99/08130 A | 2/1999 |
| WO | WO 2021/043773 A1 | 3/2021 |

OTHER PUBLICATIONS

International Search Report mailed on Apr. 29, 2022 in PCT/EP2022/051424 filed on Jan. 24, 2022, 2 pages.

*Primary Examiner* — Kiho Kim
(74) *Attorney, Agent, or Firm* — Oblon, McClelland, Maier & Neustadt, L.L.P.

(57) ABSTRACT

A method for manufacturing a detector of a first and a second incident ionizing radiation including determining the (Continued)

abscissa $e_m$ of a point of intersection between a first and a second curve, with the first and second curves representing the evolution of the number of photons or electrical charges generated per second by a transducing material as a function of the total thickness of an amplifying material when the transducing material is irradiated, through this thickness of transducing material, by the first and second incident ionizing radiation, respectively; then selecting the total thickness of amplifying material between 0.9 $e_m$ and 1.1 $e_m$ and producing the detector with the selected thickness of amplifying material.

12 Claims, 3 Drawing Sheets

(56) References Cited

U.S. PATENT DOCUMENTS

| | | |
|---|---|---|
| 6,552,347 B1 | 4/2003 | Dimcovski |
| 2017/0184730 A1 | 6/2017 | Zygmanski et al. |

\* cited by examiner

METHOD FOR MANUFACTURING A FLUX DETECTOR OF A FIRST AND A SECOND IONIZING RADIATION

The invention relates to a method for manufacturing a detector for detecting the flows of a first and a second incident ionizing radiation that differ from one another only by the fact that the median energies of the ionizing particles in the first and second incident ionizing radiation are equal to a first and a second value, respectively, with the second value differing from the first value by at least 500 keV. The invention also relates to a flow measurement method using the detector manufactured by this method and the flow detector manufactured by this method.

Such detectors are used, for example, in the field of characterizing materials, such as welds, or in the medical field and, in particular, in radiotherapy in brachytherapy or in hadron therapy. For example, such detectors are used to adjust the dimensions of the field of ionizing radiation in the case of treatments of small cancerous tumors.

Such a detector is described, for example, in application JP 2011/191255 A. The detector described in JP 2011/191255 A is advantageous in that the calibration of the detector hardly varies over a wide range of possible energies for the incident ionizing radiation to be measured. In other words, the amplitude of the measured flow hardly varies as a function of the energy of the incident ionizing radiation. By virtue of this, the measurements carried out for incident ionizing radiation with different energies are directly comparable without needing to perform a complex correction of the measurements as a function of the energy of the measured incident ionizing radiation.

To this end, JP 2011/191255 A teaches superimposing stacks, on top of one another, that are each formed by one or more thicknesses of amplifying materials and by a thickness of transducing material. The amplifying material used in JP 2011/191255 A is mainly gold. When a detector is designed according to the teaching of JP 2011/191255 A to measure high-energy incident ionizing radiation, then the total thickness of heavy material traversed by the ionizing radiation to be measured is significant, i.e., typically more than several millimeters. This increases the bulk of this detector and makes it complex to manufacture.

WO 99/18130 A1, US 2017/184730 A1 and EP 0703469 A2 are also known from the prior art.

In this application, "low-energy ionizing radiation" refers to ionizing radiation with energy below 100 keV. Conversely, "high-energy ionizing radiation" refers to ionizing radiation with energy above 100 keV and, preferably, above 500 keV or 1 MeV.

The invention aims to propose a manufacturing method that allows to obtain a detector, the calibration of which hardly varies over a wide range of energies while using a thinner amplifying material than in JP 2011/191255 A. Therefore, the invention relates to a manufacturing method.

The invention also relates to a measurement method.

The invention also relates to a detector.

The invention will be better understood upon reading the following description, which is provided solely by way of a non-limiting example and with reference to the drawings, in which.

In these figures, the same references are used to designate the same elements. Throughout the remainder of this description, the features and functions that are well known to a person skilled in the art are not described in detail.

In this description, detailed examples of embodiments are firstly described in Chapter I with reference to the figures. Then, in Chapter II, alternative embodiments of these embodiments are presented. Finally, the advantages of the various embodiments are presented in chapter III.

Figure 1:
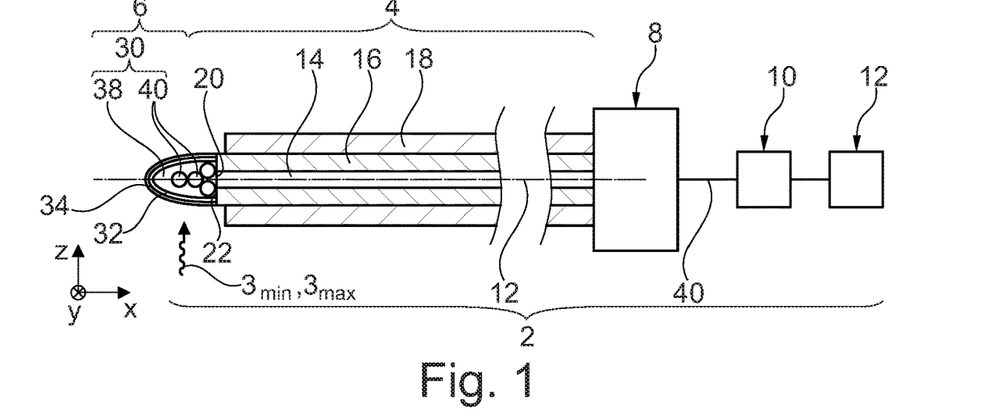
FIG. 1 is a schematic, partially cross-sectional illustration of an incident ionizing radiation flow detector.

Chapter I: Examples of Embodiments:

FIG. 1 shows a detector 2, known as "fiber dosimeter". The detector 2 in this case is designed to measure, with a constant calibration, high-energy incident ionizing radiation flows. The energies of the ionizing radiation to be measured are systematically included in an extended energy range $[V_{min}; V_{max}]$. An energy range is said to be "extended" in this case when the difference between the energies $V_{min}$ and $V_{max}$ is greater than 500 keV and, preferably, greater than 1 MeV or 4 MeV. The energy of ionizing radiation designates the median energy of the ionizing particles of this radiation. The median energy is expressed in electron-volts.

The ionizing radiation to be measured with the detector 2 are identical to each other except that they differ in terms of their energy. In this case, the incident ionizing radiation is always high-energy X-rays. In addition, this ionizing radiation propagates in the same direction of propagation parallel to a direction Z of an orthogonal XYZ coordinate system. The direction Z is vertical in this case.

Hereafter, the numerical references $3_{min}$ and $3_{max}$ denote the incident ionizing radiation with energies that are equal to $V_{min}$ and $V_{max}$, respectively. Throughout this text, the incident ionizing radiation on the detector 2 is also called "primary ionizing radiation".

In this embodiment, the radiation $3_{min}$ and $3_{max}$ respectively corresponds to the lowest energy and highest energy radiation that the detector 2 must measure.

The detector 2 comprises:
an optical fiber 4;
a part 6 sensitive to the ionizing radiation located at the distal end of the optical fiber 4;
an optical amplifier 8 connected to the proximal end of the fiber 4;
a photon sensor 10 connected to an output of the amplifier 8; and
a unit 12 for processing the signals measured by the sensor 10.

The fiber 4 is a single-mode or multi-mode optical fiber able to guide photons along a propagation axis 12. In this case, the axis 12 extends parallel to the direction X of the orthogonal XYZ coordinate system. For example, the fiber 4 is a fiber capable of transmitting any wavelength from near ultraviolet to infrared. The bandwidth of the fiber is selected so as to be centered on the luminescence wavelength of the material 30 described below. For example, the fiber 4 in this case is designed to guide light with a wavelength $\lambda_f$ ranging between 1,360 nm and 1,625 nm. In this embodiment, the wavelength $\lambda_f$ is equal to 1,550 nm. In this description, as it is used in the technical field of optical fibers, the term "light" is used in a broad sense that designates any electromagnetic wave guided by the optical fiber. In particular, the meaning of the term "light" is not limited to visible light.

The fiber 4 comprises, in the following order:
a core 14, inside which the light propagates;

a sheath 16, which surrounds the core 14; and a protective coating 18, which surrounds the sheath 16.

The material from which the core 14 is produced is a material that is selected in order to exhibit low propagation losses at the wavelength $\lambda_f$.

The spatial resolution of the measurement carried out with the detector 2 is also linked to the diameter $D_{14}$ of the core 14. For example, the diameter $D_{14}$ is less than 110 µm or 70 µm and, in the case of a single-mode optical fiber, is often less than 10 µm. The diameter $D_{14}$ is generally also greater than 1 µm or 5 µm. In this case, the diameter $D_{14}$ is equal to 50 µm and for this reason the fiber is a multi-mode fiber.

The sheath 16 is made of a material for which the refractive index, relative to the refractive index of the core 14, allows the light to be guided and effectively maintained inside the core 14. The thickness of the sheath 16 is also selected to guide and maintain the light inside the core 14. Thus, the light basically propagates inside the core 14. The thickness of the sheath 16 is conventionally greater than 50 µm or 100 µm. The outer diameter $D_{16}$ of the sheath 16 usually ranges between 1.5 $D_{14}$ and 5 $D_{14}$ or between 2 $D_{14}$ and 3 $D_{14}$. In this case, the diameter $D_{16}$ is equal to 125 µm.

The coating 18 is used to protect the sheath 16 and the core 14. It is made of polymer, for example. The thickness of the coating 18 is conventionally greater than 50 µm or 100 µm. In order to obtain a limited footprint for the sensitive part 6 of the detector 2, the outer diameter $D_{18}$ of the coating 18 is selected so as to be less than 1 mm or 500 µm. The diameter $D_{18}$ often ranges between 1.5 $D_{16}$ and 3 $D_{16}$. In this case, the diameter $D_{18}$ is equal to 220 µm.

Typically, the length of the fiber 4 between its proximal and distal ends is greater than 20 cm or 50 cm and usually less than 100 m. For example, the length of the fiber 4 is equal to 1.50 m.

The distal end of the fiber 4 comprises a light inlet face 20 produced in the core 14. In this embodiment, the face 20 is a flat circular face perpendicular to the direction X and with a diameter that is equal to the diameter of the core 14. The face 20 preferably has a large number of rotational symmetries about the axis 12. In this application, a large number of rotational symmetries refers to more than four, six or ten rotational symmetries and, preferably, an infinite number.

In addition to the face 20, the distal end also comprises a face 22 that immediately surrounds the face 20 and that is produced in the sheath 16. In this case, this face 22 is a flat annular face that completely surrounds the face 20 and that is located in the same plane as the face 20. The inner and outer diameters of this face 22 are therefore equal to the diameters $D_{14}$ and $D_{16}$, respectively.

The sensitive part 6 comprises a transducing material 30 that generates photons when it is excited by the primary and/or secondary ionizing radiation. In this case, this transducing material is a luminescent material. This transducing material 30 is entirely covered with a reflective layer 32, which itself is entirely covered with an amplifying layer 34.

The transducing material 30 in this case assumes the shape of a droplet fixed to the distal end of the fiber 4. Preferably, this droplet has a large number of rotational symmetries about the axis 12. The apex of this droplet, furthest from the face 20, is located on the axis 12.

In this case, the material 30 directly and entirely covers the face 20 and more than 50% or 70% of the surface of the face 22.

In this embodiment, the transducing material 30 assumes the shape of part of an ellipsoid, with this part of an ellipsoid being between:

a cutting plane perpendicular to its length; and its apex furthest from this cutting plane.

In the illustration of FIG. 1, the cutting plane coincides with the plane containing the faces 20 and 22.

The maximum length of the transducing material 30 in this case corresponds to the distance, along the axis 12, between the face 20 and the apex of the droplet. This maximum length ranges between 0.1 $D_{14}$ and 3 $D_{16}$. In this embodiment, the maximum length of the transducing material 30 ranges, for example, between $D_{14}$ and 2 $D_{16}$. The maximum length of the transducing material 30 therefore ranges between 50 µm and 250 µm.

In this case, the transducing material 30 is a mixture of a polymer 38 and of a scintillator 40. The spatial resolution of the measurement carried out with the detector 2 also depends on the size and the structure of the scintillator that is used. For example, the scintillator 40 is in the form of an aggregate of scintillator grains. For example, the greatest length of one of these scintillator grains is less than 40 µm or 10 µm. In this case, the average length of each scintillator grain is equal to 10 µm.

The polymer 38 in this case is a polymer capable of polymerizing and thus bonding the transducing material 30 on the distal end of the fiber 4. For example, it is PMMA (polymethyl methacrylate) polymer, or any other photosensitive resin used in microelectronics, or a polymer adhesive, or cyanolite.

The scintillator 40 is selected as a function of the wavelength $\lambda_f$ of the light intended to be generated in response to exposure to the ionizing radiation to be measured. In the case of a wavelength $\lambda_f$ equal to 1,550 nm, for example, the following scintillator 40 is suitable: $In_xGa_{(1-x)}As$, where the index X is equal to 0.45. This scintillator is sensitive to X-rays and, in particular, to low-energy X-rays.

The layer 32 reflects the light emitted by the transducing material 30 in order to return it, as far as possible, toward the face 20. "Reflecting light" refers to the fact that the layer 32 reflects at least Z % of the light at the wavelength $\lambda_f$, where Z is a number greater than 50 and, preferably, greater than or equal to 90 or 95. Moreover, in this case, the layer 32 is made of a material transparent to ionizing radiation that excites the transducing material 30. In this case, "transparent to ionizing radiation" refers to the fact that the layer 32 allows through at least Y % of the incident ionizing radiation, where Y is a number strictly greater than 50 and, preferably, greater than or equal to 80, 90 or 95. For example, the layer 32 is made of aluminum.

The thickness of the layer 32 is low, i.e., less than 10 µm and, preferably, less than 1 µm or 300 nm. The thickness of the layer 32 is also generally greater than 20 nm or 50 nm. In this case, the thickness of the layer 32 ranges between 100 nm and 300 nm. For example, the thickness of the layer 32 is equal to 150 nm.

The layer 34 interacts with the primary ionizing radiation in order to generate a lower energy secondary ionizing radiation in response. This secondary radiation is, for example, made up of lower energy X-rays and/or lower energy ionizing particles. The secondary radiation re-emitted by the layer 34 depends on the material used to manufacture the layer 34 and on the energy of the incident primary radiation. By way of an indication, if the layer 34 is made of lead (atomic number 82), if the energy of the primary ionizing radiation is greater than 6 MeV, the secondary ionizing radiation is mainly made up of electron-positron pairs. If the primary ionizing radiation ranges between 1 MeV and 6 MeV, the secondary ionizing radiation is mainly made up of electrons and high-energy X-rays emitted by the Compton effect. If the primary ionizing radiation ranges between 10 keV and 1 MeV, the secondary ionizing radiation is mainly made up of high-energy X-rays emitted by the photoelectric effect. In this latter case, the phenomenon is known as "X-ray fluorescence" and is even more widely known using the acronym XRF.

Due to the presence of the layer 34, the transducing material 30 is exposed, in addition to the primary ionizing radiation, to the secondary ionizing radiation generated by the layer 34. In addition, the energy of the secondary radiation is lower than the incident ionizing radiation and is therefore absorbed more by the transducing material 30, which also increases its emission. Thus, in response to the same intensity of the primary ionizing radiation, the transducing material 30 generates more photons than if the layer 34 was omitted. The layer 34 therefore amplifies the number of photons generated, which enhances the sensitivity of the detector 2.

It is acknowledged that the flow of the secondary ionizing radiation generated by the layer 34 increases:
 as a function of the atomic number of the atoms of the material it is made up of; and
 of the thickness $e_{34}$ of this layer 34.

In this embodiment, the layer 34 is traversed twice by the primary ionizing radiation that propagates parallel to the direction Z. Under these conditions, the total thickness $e_T$ of amplifying material traversed by the primary ionizing radiation is equal to $2e_{34}$.

In order to significantly increase the number of photons generated by the transducing material 30, it has been determined that the thickness $e_T$ must be greater than 15 µm and, preferably, greater than 30 µm or 50 µm.

Moreover, in this embodiment, in order to minimize the bulk of the sensitive part 6, the thickness $e_T$ is also preferably less than 1.5 mm or 1 mm. In addition, as explained in detail hereafter, the thickness $e_T$ is selected so that the calibration of the detector 2 is the same when the radiation $3_{min}$ is measured as when the radiation $3_{max}$ is measured. In FIG. 1, the thicknesses of the various layers have not been shown to scale.

It has also been determined that the atomic number at which point the increase in the number of photons generated by the transducing material is significant, is No. 29, i.e., that corresponding to copper. Hereafter, the term "heavy" refers to any material with an atomic number that is greater than or equal to 29. In addition, in this embodiment, in order for the thickness $e_T$ to remain less than 1 mm, the layer 34 is mainly made of a heavy material, the atomic number of which is greater than or equal to 74 (tungsten) and, preferably, greater than or equal to 79, i.e., to that corresponding to gold.

In this description, the expression "an element mainly made of material X" means that the material X represents at least 70% or 90% or 95% of the mass of this element.

Finally, preferably, the material selected to produce the layer 34 must allow a deposit to be implemented in the form of a layer that is as easy to produce as possible. For example, gold and lead are metals that meet the various constraints set forth above. In this case, by way of an illustration, the layer 34 is entirely made of lead.

In this case, the wavelength $\lambda_f$ that is used corresponds to a wavelength conventionally used in the telecommunications industry. Thus, the amplifier 8 is, preferably, an optical amplifier conventionally used in the telecommunications industry for amplifying and repeating the light that propagates inside optical fibers, yet without having to convert the light to be amplified into an electrical signal. An embodiment of such an amplifier is illustrated in FIG. 2 of the application filed on Jan. 9, 2020 under the number PCT/EP 2020/074364.

The amplified optical signal is sent to the sensor 10 via an optical fiber 40. The sensor 10 measures a physical quantity proportional to the number of photons received per second. This number of photons received per second constitutes a measurement proportional to the flow of ionizing particles of the primary ionizing radiation. To this end, in this case, the sensor 10 converts the received light intensity into an electrical signal processed by the processing unit 12. The received light intensity is proportional to the number of photons received per second. The sensor 10 is a photodiode or a photon counter, for example.

The unit 12 receives the electrical signal generated by the sensor 10 and, in response, controls one or more electrical appliances. For example, the controlled electrical appliance is a screen that displays the intensity of the primary ionizing radiation measured by the detector 2. The controlled electrical appliance also can be the source of the primary ionizing radiation, which allows, for example, the intensity of this primary ionizing radiation to be set to an intensity setpoint recorded in the unit 12.

Figure 2:
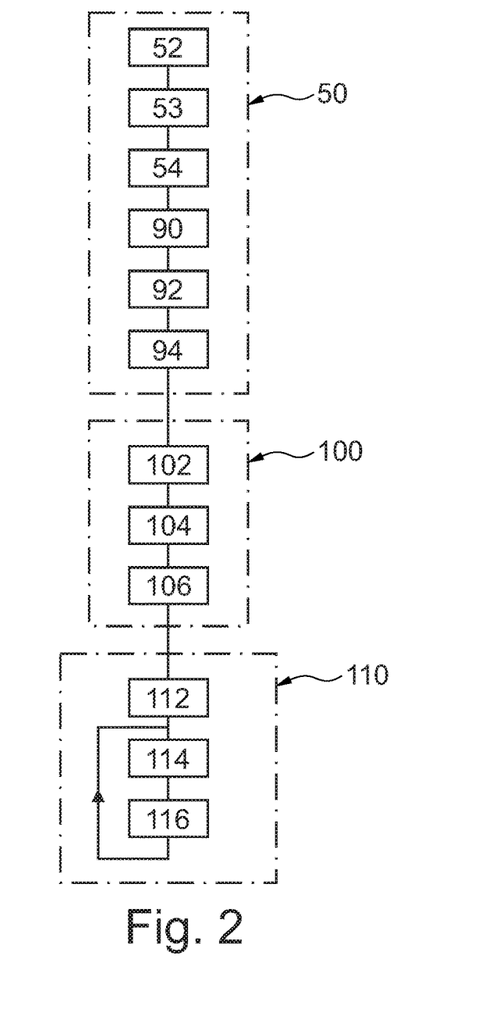
FIG. 2 is a flow chart of a method for manufacturing and using the detector of FIG. 1.

FIG. 2 shows a method for manufacturing and using the detector 2 in the particular case where the values $V_{min}$ and $V_{max}$ are equal to 2 MeV and 4.5 MeV, respectively.

The method begins with a phase 50 of designing the detector 2.

During a step 52, values $V_1$ and $V_2$ are acquired. These values $V_1$ and $V_2$ define the range over which the calibration of the detector 2 hardly varies as a function of the energy of the primary ionizing radiation to be measured. In order to produce the detector 2, the values $V_1$ and $V_2$ must be close to the values $V_{min}$ and $V_{max}$, respectively. For example, in this case, the value $V_1$ is selected in the range [0.7 $V_{min}$; 1.1 $V_{min}$] and the value $V_2$ is selected in the range [0.9 $V_{max}$; 1.3 $V_{max}$]. Preferably, the values $V_1$ and $V_2$ are selected to be equal to the values $V_{min}$ and $V_{max}$, respectively. In this case, the values $V_1$ and $V_2$ are therefore equal to 2 MeV and 4.5 MeV, respectively.

Then, during a step 53, the amplifying material to be used to produce the layer 34 is selected. In this case, lead is selected.

Figure 3:
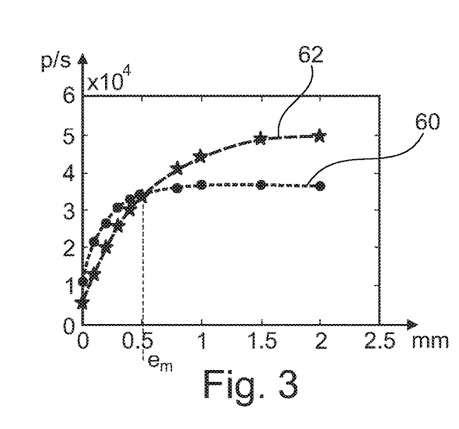
FIGS. 3, 5 and 6 are graphs illustrating curves used when manufacturing the detector of FIG. 1.

During a step 54, the curve 60 (FIG. 3) is acquired. The curve 60 shows the evolution of the number of photons generated per second by the transducing material 30 as a function of the thickness $e_T$ of amplifying material traversed by the radiation $3_{min}$. In FIG. 3, the abscissa axis is graduated in millimeters and the ordinate axis is graduated by the number of photons per second, denoted "p/s".

Figure 4:
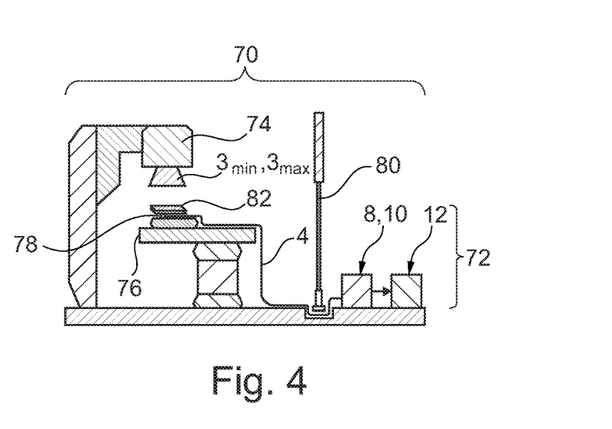
FIG. 4 is a schematic illustration of a measurement test bench used to acquire the curves of FIGS. 3, 5 and 6.

In this case, the curve 60 is acquired experimentally. To this end, the measurement test bench 70 shown in FIG. 4 is used. This test bench 70 comprises:
 a detector 72 for detecting the flow of the primary ionizing radiation that is identical to the detector 2 except that the sensitive part 6 is replaced by a sensitive part 78;
 a source 74 able to alternately emit the radiation $3_{min}$ and $3_{max}$ to be measured by the detector 72;
 a support 76 that supports the sensitive part 78 of the detector 72;
 a protective wall 80 for dividing the test bench 70 into two distinct zones, namely a zone exposed to the radiation $3_{min}$ and $3_{max}$ and in which the source 74 and the sensitive part 78 are located, and a zone protected from the ionizing radiation, in which the amplifier 8, the sensor 10 and the processing unit 12 of the detector 72 are located.

The source 74 is, for example, a Linear Particle Accelerator (LINAC).

The sensitive part 78 is identical to the sensitive part 6 except that the amplifying layer 34 is omitted.

Finally, this measurement test bench 70 also comprises a set of several detachable lead plates, each with different thicknesses. In FIG. 4, only one plate 82 of this set is shown. During the measurements, only one of the plates of this set is deposited onto the sensitive part 78. This is shown in FIG. 4 in the particular case of the plate 82. The plate 82 mainly extends in a horizontal plane perpendicular to the direction of propagation of the radiation $3_{min}$ and $3_{max}$. The plate 82 is deposited directly onto the sensitive part 78.

In order to construct the curve 60, the source 74 is adjusted to emit the radiation $3_{min}$. During each measurement, the radiation $3_{min}$ is generated by the source 74 and the detector 72 measures the flow of this radiation.

If a lead plate is deposited onto the sensitive part 78, the detector 72 measures the number of photons per second generated by the material 30 after the radiation $3_{min}$ has passed through this lead plate.

In this case, a first measurement is carried out in the absence of a lead plate deposited onto the sensitive part 78. This allows the point of the curve 60 to be acquired that corresponds to a zero thickness $e_T$ of amplifying material.

Then, measurements are taken for various thicknesses of the lead plate. To this end, the detachable lead plate is replaced by a lead plate with a different thickness each time. This allows different points of the curve 60 to be acquired for different thicknesses of the lead plate.

The curve 60 is then constructed by interpolation between the various measured points. For example, the interpolation is a polynomial interpolation per part.

During a step 90, the curve 62 (FIG. 3) is acquired. The curve 62 represents the evolution of the number of photons per second generated by the material 30 as a function of the thickness $e_T$ traversed by the radiation $3_{max}$. The curve 62 is acquired as described in the case of the curve 60 except that the source 74 is adjusted to emit the radiation $3_{max}$ instead of the radiation $3_{min}$.

During a step 92, the abscissa $e_m$ of the point of intersection between the curves 60 and 62 is determined. In this case, the abscissa $e_m$ is less than or equal to 600 μm and greater than or equal to 450 μm. In this example, the abscissa $e_m$ is equal to 0.5 mm. This point of intersection is particularly advantageous since this means that when the thickness $e_T$ is equal to or close to the value of the abscissa $e_m$, then the calibration of the detector 2 is independent of the energy of the radiation $3_{min}$ and $3_{max}$.

During a step 94, the thickness $e_T$ is selected between 0.9 $e_m$ and 1.1 $e_m$ and, preferably, between 0.95 $e_m$ and 1.05 $e_m$ and, even more advantageously, between 0.98 $e_m$ and 1.02 $e_m$. In this case, the thickness $e_T$ is equal to $e_m$.

In the case of the sensitive part 6, the thickness $e_T$ is equal to $2e_{34}$ since the primary ionizing radiation to be measured successively traverses the layer 34, then the material 30 a first time, then the layer 34 a second time. When traversing the layer 34 the first and the second time, the layer 34 interacts with the primary ionizing radiation each time. The result of each of these interactions is that the layer 34 produces secondary ionizing particles with lower energy than the energy of the primary ionizing particles of the primary ionizing radiation. These secondary ionizing particles can be photons, electrons or positrons. These secondary ionizing particles are emitted in all directions by the layer 34. Thus, even the second time traversing the layer 34 produces secondary ionizing particles that will then interact with the material 30.

The thickness $e_{34}$ in this case is selected so as to be equal to $e_m/2$, i.e., equal to 300 μm. Under these conditions, the number of photons per second generated by the material 30 is identical both for the radiation $3_{min}$ and for the radiation $3_{max}$. In addition, it has also been seen that the sensitivity of the detector 2 is substantially constant as long as the energy of the primary ionizing radiation to be measured using this detector 2 ranges between the values $V_{min}$ and $V_{max}$. Thus, the calibration of the detector 2 hardly varies as long as the energy of the primary ionizing radiation remains between the energy levels $V_{min}$ and $V_{max}$.

Once the thickness $e_{34}$ has been determined, the design phase ends and the method continues with a phase 100 of manufacturing the detector 2.

During a step 102, the stack of the thickness $e_T$ of amplifying material and of the thickness of transducing material is produced. For example, a liquid mixture of the polymer 38 and the scintillator 40 is prepared. Next, the distal end of the fiber 4 is soaked in this liquid mixture and then removed. The droplet of the liquid mixture that remains adhered to the distal end of the fiber 4 is then dried, for example, by placing it in a heated furnace for a few seconds. The droplet then becomes solid and forms the transducing material 30.

Next, the layer 32 is deposited onto the transducing material 30 by a conventional deposition method such as by spraying or by evaporation. Depending on the deposition method that is implemented, a very thin adhesion layer is firstly deposited onto the transducing material 30. The thickness of this adhesion layer is generally less than 20 nm. For example, the adhesion layer is made of titanium or chromium.

Finally, the layer 34 is deposited directly onto the layer 32, for example, using the same deposition methods as those described in the particular case of the layer 32. It also can be deposited using other faster and less expensive deposition methods, such as electrolysis or "electroless" deposition. Optionally, a very thin adhesion layer, that is less than 20 nm thick, is interposed between the layer 32 and the layer 34.

The thickness $e_{34}$ of the deposited layer 34 in this case is equal to that selected during the design phase 50, i.e., equal to 300 μm.

Thus, in the direction Z of propagation of the incident radiation to be measured, a stack of amplifying material and of transducing material is acquired, in which stack the thickness $e_T$ of amplifying material traversed by the ionizing radiation to be measured is equal to $e_m$.

Then, during a step 104, the proximal end of the fiber 4 is optically connected to the amplifier 8 and the amplifier 8 is optically connected to the sensor 10.

During a step 106, the sensor 10 is connected to the processing unit 12.

The manufacture of the detector 2 is then completed and a use phase 110 can begin.

During the phase 110, the detector 2 is used to measure the flow of multiple primary ionizing radiation levels, the energies of which are systematically included in the range $[V_{min}; V_{max}]$.

Thus, during a step 112, the sensitive part 6 of the detector 2 is positioned relative to the source of the primary ionizing radiation to be measured, as described with reference to FIG. 1. Thus, the axis 12 extends horizontally and the ionizing radiation to be measured propagates parallel to the direction Z.

The sensitive part 6 is also placed, for example, inside an object to be treated or to be imaged with the primary ionizing radiation. The sensitive part 6 also can be placed in front of or behind this object to be treated.

Then, during a step 114, the primary ionizing radiation is emitted and, at the same time, the detector 2 measures the number of photons per second generated by the material 30. This measured number of photons per second is then multiplied, for example, by the exposure time of the object to this incident ionizing radiation and by the energy of this incident ionizing radiation in order to obtain a dose of the incident ionizing radiation applied to this object during step 114. For example, during the first execution of step 114, the primary ionizing radiation used is the radiation $3_{min}$.

Then, during a step 116, the adjustment of the primary ionizing radiation source is modified in order to emit another primary ionizing radiation with different energy. This different energy ranges between the values $V_{min}$ and $V_{max}$. Next, step 114 is executed again but this time with this other primary ionizing radiation. For example, during a second execution of step 114, the primary ionizing radiation used is the radiation $3_{max}$.

Given that the detector 2 has been designed so that its calibration is the same for the radiation $3_{min}$ as for the radiation $3_{max}$, the measurements of the detector 2 carried out during step 114 do not need to be corrected or are simpler to correct in order to compensate for a variation in the calibration of the detector 2 as a function of the energy of the primary ionizing radiation that is used.

Figure 5:
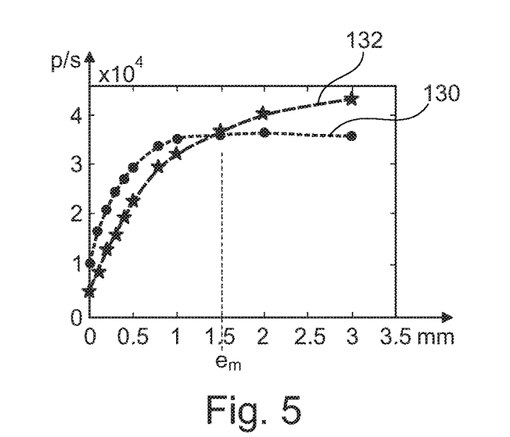

The description provided above applies to amplifying materials other than lead. Although heavy materials such as gold, lead and tungsten are preferred for the applications targeted for the detector 2, the description provided above also applies to other heavy materials with an atomic number that is less than 74. In particular, experiments were carried out in order to verify that there is always a point of intersection between curves similar to curves 60 and 62, but constructed for other materials. In order to illustrate this, the graph of FIG. 5 shows curves 130 and 132 acquired experimentally as described above but using a set of copper plates with different thicknesses instead of the set of lead plates. The curves 130 and 132 correspond to the 2 MeV and 4.5 MeV energies, respectively.

Figure 6:
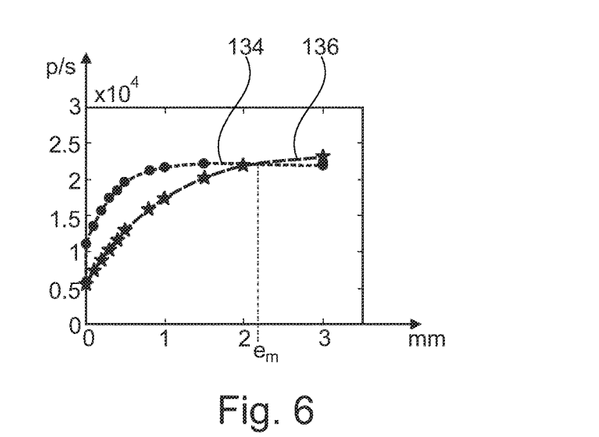

FIG. 6 shows experimentally measured curves 134 and 136 in the case where a set of aluminum plates with different thicknesses is used instead of the set of lead plates. The curves 134 and 136 correspond to the 2 MeV and 4.5 MeV energies, respectively. In this case, the thickness $e_m$ is equal to 2,100 μm.

It should be noted that the value of the abscissa $e_m$ increases when the atomic number of the amplifying material that is used decreases. It has been determined that the abscissa $e_m$ is less than 1 mm only if the amplifying material is mainly made of materials with atomic numbers that are greater than 74 or 79.

The teaching provided in the particular case of a fiber dosimeter also can be applied to the detectors in which the sensitive part comprises a transducing material that generates electrical charges when it is excited by the secondary ionizing radiation instead of photons. Such detectors are called "semi-conductor dosimeter". They are also known using the term "electronic sensor" or "electronic detector" of the PIN or transistor or Schottky junction or avalanche diode type.

Figure 7:
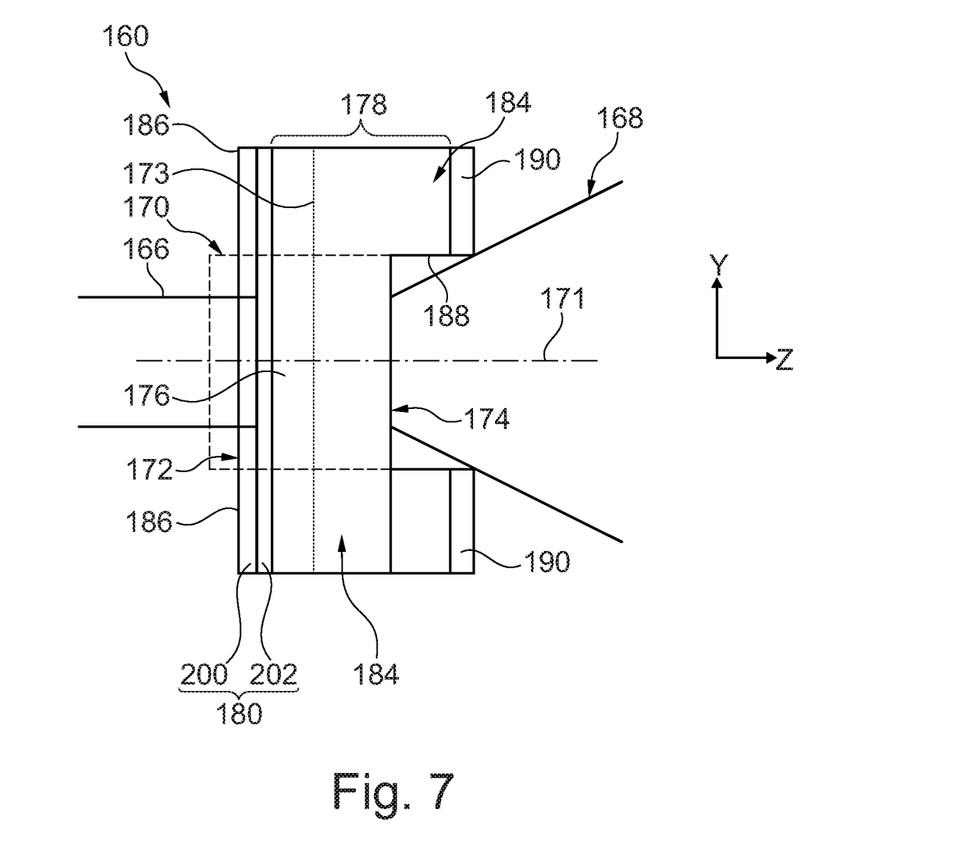
FIG. 7 is a schematic illustration of another embodiment of the detector of FIG. 1.

By way of an illustration, FIG. 7 shows a possible example of an arrangement of such a detector 160. In this embodiment, the architecture of the detector 160 differs from that described with reference to FIG. 2 of application WO 2017/198630 mainly by the fact that it also comprises an amplifying layer. Thus, for further details concerning the known features of the architecture of the detector 160 or the various alternative embodiments of such an architecture, the reader can consult this application WO 2017/198630.

The detector 160 comprises a sensitive part 170 located on an axis 171, along which the primary ionizing radiation propagates. The sensitive part 170 is centered on the axis 171. More specifically, in this embodiment, the sensitive part 170 is a rotational cylinder, the axis of revolution of which coincides with the axis 171.

The sensitive part 170 has an inlet face 172 located in a vertical plane parallel to directions X and Y of an orthogonal XYZ coordinate system, where the direction Z is parallel to the axis 171. The face 172 is directly exposed to the incident primary ionizing radiation 166. The sensitive part 170 also comprises an outlet face 174 located in another vertical plane perpendicular to the axis 171. The portion of the beam 166 that has not interacted with the sensitive part 170, emerges from the detector 160 via the face 174 and forms a beam 168.

The sensitive part 170 comprises a transducing material able to generate electrical charges when it is traversed by the primary ionizing radiation. In this embodiment, the transducing material is a depletion region 176 also called "space charge zone". This region 176 produces a first type of charge carriers and a second type of charge carriers when it is traversed by the radiation 166. This region 176 is located between the face 172 and a limit 173 represented by a dotted line parallel to the directions X and Y.

In this example, the detector 160 comprises a semiconductive layer 178 and a conductive layer 180 directly deposited onto the face of the layer 178 oriented toward the incident ionizing radiation 166. The face 172 in this case is formed by the outer face of the layer 180 oriented toward the incident ionizing radiation 166. The face 174 of the sensitive part 170 is formed by the face of the layer 178 oriented away from the face 172.

The region 176 is located in the region of the layer 178 in contact with the conductive layer 180. The association of the layers 178 and 180 forms a junction with a rectifying effect, and more specifically a Schottky diode in this embodiment.

The semi-conductor material used to produce the layer 178 comprises two energy bands known under the terms "valence band" and "conduction band", respectively. In the case of semi-conductor materials, these two energy bands are separated from each other by a band gap more commonly known as "gap". Preferably, the semiconductor material used to produce the layer 178 is a wide-gap semi-conductor material, i.e., a semi-conductor material having a gap with a value that is at least two times greater than the value of the gap of the silicon. Typically, the gap of the semi-conductor material used for the layer 178 is therefore greater than 2.3 eV.

In this case, the layer 178 is made of SiC-4H silicon carbide. Furthermore, the semi-conductor layer 178 is also doped. For example, when the semi-conductor layer 178 is made of silicon carbide, P-doping can be obtained by implanting boron atoms and, alternatively, N-doping can be obtained by implanting nitrogen atoms.

In this embodiment, the layers 178 and 180 transversely extend beyond the sensitive part 170 in order to form a peripheral part 184 that completely surrounds the sensitive part 170. Unlike the sensitive part 170, the peripheral part 184 is not traversed by the radiation 166. The portion 186 of the conductive layer 180 that extends beyond the sensitive part 170 forms a first electrode that collects the first type of charge carriers produced by the region 176.

In this case, the thickness of the semi-conductor layer 178 in the peripheral part forms the side walls of a blind hole 188, the bottom of which coincides with the face 174.

Finally, only in the peripheral part 184, the face of the semi-conductor layer 178 located on the side opposite the face 172 is covered with a conductive layer 190. The conductive layer 190 forms a second electrode that collects the second type of charge carriers produced by the region 176.

In this embodiment, the conductive layer 180 also acts as an amplifying layer. To this end, it is mainly made of heavy metals and its thickness e 180 is greater than 15 μm and, preferably, greater than 30 μm or 50 μm. The conductive layer 180 is, for example, made of metal such as copper, zinc, tungsten, gold or lead.

In this embodiment, the layer 180 is formed by stacking several sub-layers on top of each other that are each made of a different heavy material. The thickness of each of these sub-layers is, for example, greater than 15 μm or 30 μm or 50 μm. In this case, preferably, the sub-layers are stacked on one another in the ascending order of the atomic numbers of their constituent heavy materials. The sub-layer made up of the heavy material with the smallest atomic number is closest to the transducing material. For example, the amplifying layer 180 in this case comprises, in this order, a sub-layer 200 of gold and then a sub-layer 202 of copper. In this case, when the primary ionizing radiation reaches the outer sub-layer 200, this sub-layer 200 absorbs the primary ionizing radiation and reemits a lower energy secondary ionizing radiation than the primary ionizing radiation. This secondary radiation is better adapted to exciting the next sub-layer 202. When the next sub-layer 202 is excited, it in turn generates secondary ionizing radiation with even lower energy. The energy of the secondary ionizing radiation is thus gradually reduced before reaching the transducing material. This allows the sensitivity of the dosimeter to the radiation 166 to be enhanced.

Furthermore, the thickness $e_{180}$ of the layer 180 is selected so that the sensitivity of the detector 160 is the same when it measures the flow of the radiation $3_{min}$ and when it measures the flow of the radiation $3_{max}$. To this end, the thickness $e_{180}$ is selected by implementing the same methodology as that described with reference to FIG. 2. In particular, curves similar to the curves 60 and 62 are acquired as described above except that the set of lead plates is replaced by a set of plates each comprising the sub-layer 202 of thickness $e_{202}$ and the sub-layer 200 of thickness $e_{200}$. The plates of this set differ from one another only by the thickness $e_{200}$, which is different for each plate. The thickness $e_{202}$ is constant, for example, and is selected before step 54. The abscissa $e_m$ and the total thickness $e_T$ are then determined as described above.

In this case, the total thickness $e_T$ of amplifying material traversed by the radiation $3_{min}$ and $3_{max}$ is equal to the thickness $e_{180}$. Under these conditions, the thickness 10) $e_{180}$ is selected between 0.9 $e_m$ and 1.1 $e_m$. For example, the thickness $e_{180}$ is selected so as to be equal to $e_m$. The thickness $e_{200}$ is then taken as equal to $e_{180}$-$e_{202}$.

The operation of the layer 180 is deduced from the explanations provided in the previous embodiment.

Chapter II: Alternative Embodiments:

Alternative Embodiments of the Transducing Material:

It is possible to use other luminescent materials generating light at wavelengths $\lambda_f$ other than those included between 1,360 nm and 1,625 nm. In this case, the optical fiber must be adapted to exhibit propagation losses that are as low as possible at the selected wavelength $\lambda_f$. For example, the description provided in this application can be applied to the case of luminescent materials generating light at a wavelength ranging between 350 nm and 2,000 nm or even outside this wavelength range.

Other scintillators are known and can be used instead of the scintillator 40. For example, any scintillator with a small ternary or quaternary gap based on GaAs or InP or GaSb emitting in the infrared domain is suitable. The selected scintillator particularly depends on the desired wavelength $\lambda_f$. By way of an example of other scintillators that can be used with X-rays, it is possible to cite barium platinocyanate, ZnS alloy doped with silver (Ag), $Ag_2S$ alloy doped with europium (Eu), $Gd_2O_2S$ alloy doped with europium (Eu), $ZnWO_3$ alloy, CsI alloy doped with europium (Eu), quantum dots, etc.

In a particular embodiment, the luminescent material is integrated inside the core 14 of the optical fiber. For example, the distal end of the core 14 of the optical fiber is doped with a dopant that converts the secondary ionizing radiation into light. For example, this dopant is Erbium incorporated by ion implantation. In this embodiment, the reflective layer is deposited directly onto this doped distal end and the amplifying layer is deposited onto the reflective layer. For example, to this end, the outer face of the doped distal end of the core 14 is exposed and the reflecting and amplifying layers are deposited onto this exposed face. In this case, the optical fiber does not have a light inlet face since the light is directly generated by the dopant inside the core of the optical fiber.

In the embodiment of FIG. 1, the transducing material can assume other shapes such as part of a sphere or a cylinder. The dimensions of the scintillator grains of the transducing material 30 can be smaller. For example, as an alternative embodiment, the greatest length of the scintillator grains is less than 10 nm.

Alternative Embodiments of the Amplifying Material:

The amplifying layer can be mainly produced by a set of one or more heavy metals selected from the group made up of silver (Ag), zinc (Zn), copper (Cu), titanium (Ti), cobalt (Co), chromium (Cr), tungsten (W), gold (Au) and lead (Pb). Since the bulk of the sensitive part decreases when the atomic number of the one or more heavy materials used increases, the selection of the amplifying material to be used also can be restricted by a limit on the maximum bulk of the sensitive part. The amplifying layer also can be made of any other heavy material commonly deposited in the electronics industry, even if it is not a metal.

In another embodiment, the amplifying layer is made of an alloy of several heavy materials and, for example, of an alloy of gold and lead.

As illustrated in the particular case of the embodiment of FIG. 7, the amplifying layer is not necessarily formed of a single layer of heavy material. This also applies to the case of fiber dosimeters. Preferably, in the case of fiber dosimeters, the heavy metal of the sub-layer closest to the scintillator comprises an element of the scintillator. For example, if the scintillator is ZnS, then the sub-layer closest to this scintillator is made of zinc. This allows the ultimate metal layer closest to the scintillator to generate X-ray photons in line with the absorption of the scintillator.

In a particular embodiment, the amplifying layer of the detector 160 comprises a single amplifying layer. In this case, the amplifying layer of the semi-conductor dosimeter does not comprise a stack of several amplifying sub-layers.

Other Alternative Embodiments of the Detector:

Other materials can be used to produce the reflective layer 32. For example, the layer 32 also can be made of another metal or even using a stack of thin dielectric layers designed to reflect light.

When the amplifying layer is sufficient to on its own cause a sufficient amount of photons to be generated that penetrate inside the core 14, then the reflective layer 32 is omitted. The reflective layer also can be omitted when the amplifying layer sufficiently reflects the light generated by the luminescent material. This is the case, for example, when the amplifying layer is made of metal. For example, in a simplified embodiment, a single layer made of gold, with a thickness greater than 15 µm, fulfils both the functions of the amplifying and reflecting layers.

In a particular embodiment, the sensitive parts of several identical dosimeters are grouped together in rows and columns in order to form a matrix of several sensitive parts. In this case, each sensitive part measures the intensity of a pixel of an image of the spatial distribution of the intensity of the primary ionizing radiation.

The various alternative embodiments of the sensitive part 6 and of the fiber 4 described in the application filed under the number PCT/EP2020/074364 are applicable to the various embodiments described herein.

Numerous other embodiments of the detector 160 are possible. For example, the depletion region 176 also can be formed as a PN diode or a PIN diode or by the depletion region of a field-effect transistor. In particular, the addition of an amplifying layer in a semi-conductor dosimeter applies to the various architectures of such a semi-conductor dosimeter described in application WO 2017/198630 A1.

As an alternative embodiment, the order in which the thicknesses of amplifying material and transducing material are stacked is reversed. In this case, the incident ionizing radiation firstly traverses the transducing material before reaching the amplifying material. The operation of such an embodiment is similar to that described above.

As an alternative embodiment, the detector can comprise layers of transducing material separated from one another by one or more layers of amplifying material.

30) As an alternative embodiment, the incident ionizing radiation to be measured propagates parallel to the axis 12 of the detector 2. In this case, it only traverses the layer 34 once. Consequently, the thickness $e_{34}$ is then selected between 0.9 $e_m$ and 1.1 $e_m$ in order to acquire a calibration for this detector that hardly varies as a function of the energy of the incident ionizing radiation.

The description provided herein for the thickness of the layer 34 applies to any other embodiment of the sensitive part 6. For example, the sensitive part 6 can be produced as described with reference to FIGS. 3 and 4 of the application filed under the number PCT/EP2020/074364.

Alternative Embodiments of the Manufacturing Method:

As an alternative embodiment, the detector used to construct the curves 60 and 62 does not have the same architecture as the detector 2. For example, the volume of transducing material used during steps 54 and 90 can differ from the volume of transducing material of the detector 2. Preferably, the transducing materials used in the detector 2 and during steps 54 and 90 are the same. The amplifying material used to construct the curves 60 and 62 must be the same as that used to manufacture the sensitive part 6 of the detector 2.

As illustrated by step 54, the lateral dimensions of the plates that are used, i.e., in this case the dimensions perpendicular to the direction of propagation of the measured ionizing radiation, can be very different from those implemented in the manufactured sensitive part 6. For example, during the design phase, these lateral dimensions can be several centimeters, whereas in the sensitive part these lateral dimensions are less than 1 mm or 500 µm.

The construction of the curves 60 and 62 can be carried out upstream of the phase 50 of designing the detector 2. For example, such curves are constructed beforehand for a large number of different values of the energy of the ionizing radiation to be measured and for several heavy materials, including lead, gold and tungsten. Step 54 then simply involves selecting, from among these various curves previously constructed for the same material as that used for manufacturing the layer 34, the two curves constructed for values $V_1$ and $V_2$ that are close to the values $V_{min}$ and $V_{max}$, respectively.

As an alternative embodiment, the curves 60 and 62 are not measured experimentally but are computed by means of numerical simulation. For example, the following relations (1) and (2) are used to construct these curves:

$$N = N_{OE}\exp(-\mu_E^{1,p}t) + \Phi_0 S(1-\exp(-\mu_E^{1,p}t))\sum \tau_E^{1,i}(1-\exp(-\mu_{E'}^{0,i}d))Y_{E'}^{0,i}$$

$$N_{OE} = \Phi_0 \times S(1-\exp(-\mu_E^{0,p}d)) \times Y_E^{0,p}$$

where:

N is the number of photons generated per second;

$N_{OE}$ is the number of photons generated per second by a detector identical to the detector 2 except that it is devoid of the amplifying layer 34;

"exp ( . . . )" denotes the exponential function;

$\Phi_0$ is the density of the flow of primary ionizing particles of the primary ionizing radiation that reaches the transducing material, with this density being expressed as a number of primary ionizing particles per second and per square meter;

S is the surface of transducing material exposed to the primary incident ionizing radiation;

$\mu_E^{0,p}$ is the absorption rate, by the transducing material, of primary ionizing particles of the primary ionizing radiation of energy E;

d is the thickness of transducing material traversed by the primary ionizing radiation;

$Y_E^{0,p}$ is the probability that the transducing material generates a visible photon when this transducing material absorbs and interacts with a primary ionizing particle of the primary ionizing radiation of energy E;

$\mu_E^{1,p}$ is the absorption rate of primary ionizing particles of the primary ionizing radiation of energy E by the amplifying material;

t is equal to the thickness of amplifying material traversed by the primary incident ionizing radiation before reaching the transducing material when the detector is exposed to this ionizing radiation;

the symbol "Σ" denotes the sum ranging from i=1 to i=$T_{max}$, where $T_{max}$ is the number of different types of secondary ionizing particles generated by the amplifying material when it is exposed to the primary ionizing radiation of energy E;

$T_E^{1,i}$ is the probability that following an interaction between a primary ionizing particle of the primary ionizing radiation of energy E with the amplifying material, a secondary ionizing particle of type i is generated;

i is an identifier of a particular type of secondary ionizing particles capable of being generated by interaction between the primary ionizing radiation and the amplifying material;

$\mu_E^{0,i}$ is the absorption rate of secondary ionizing particles of type i and of energy E' by the transducing material;

$Y_E^{0,i}$ is the probability that the transducing material generates a visible photon when it absorbs and interacts with a secondary ionizing particle of type i and energy E'.

In this case, the interaction of a primary ionizing particle with the amplifying material can produce four different types of secondary ionizing particles, namely a photon, a positron, a neutron or an electron. In this case, values 1 to 4 of the index i respectively correspond to a photon, to a positron, to a neutron and to an electron. $T_{max}$ is equal to four.

In the case of lead and of values $V_1$ and $V_2$ equal to 2 MeV and 4.5 MeV, respectively, the available literature indicates that $U_2^{1,p}$ is equal to 0.52 cm$^{-1}$ and that $\mu_{4.5}^{1,p}$ is equal to 0.48 cm$^{-1}$. Thus, for low thicknesses of amplifying material, the relation (1) can be approximated by the following relation (3):

$$N \approx N_{0E} + \Phi_0 S \mu_E^{1,p} \{ \sum \tau_E^{1,i}(1 - \exp(-\mu_E^{0,i}d)) Y_E^{0,i} \} t$$

The description provided in the particular case whereby the values $V_1$ and $V_2$ are equal to 2 MeV and 4.5 MeV, respectively, is applicable to other values of $V_1$ and $V_2$. In particular, it is worthwhile selecting the values $V_1$ and $V_2$ that are equal to 500 keV and to 10 Mev, respectively. Indeed, this allows to obtain a detector that can be used for practically all the applications related to the field of characterizing materials and to the medical field. It is also worthwhile selecting the values $V_1$ and $V_2$ equal to 100 keV and to 600 keV, respectively, because the range [100 keV; 600 keV] of energies is significantly used in brachytherapy. Other energy ranges are of interest. In particular, the ranges [25 MeV; 50 MeV] and [230 MeV; 250 MeV] are of interest because they are used in the medical field, in particular when the ionizing radiation is a proton beam. By way of an illustration, the order of magnitude of the thickness $e_m$, acquired from a limited number of experiments in the case whereby the amplifying material is lead, is provided below for different energy ranges:

$e_m$=400 μm when the values $V_1$ and $V_2$ are equal to 1 MeV and 2 MeV, respectively;

$e_m$=400 μm when the values $V_1$ and $V_2$ are equal to 1 MeV and 3 MeV, respectively;

$e_m$=460 μm when the values $V_1$ and $V_2$ are equal to 1 MeV and 4.5 MeV, respectively;

$e_m$=450 μm when the values $V_1$ and $V_2$ are equal to 2.5 MeV and 3 MeV, respectively; and $e_m$=600 μm when the values $V_1$ and $V_2$ are equal to 3 MeV and 4 MeV, respectively.

As an alternative embodiment, the radiation $3_{min}$ and the radiation $3_{max}$ are simultaneously applied to the detector 2. In this case, the flow of ionizing particles measured by the detector 2 is the accumulation of the flow of ionizing particles generated by the radiation $3_{min}$ and $3_{max}$. It should be noted that this measurement of the combined flows of the radiation $3_{min}$ and $3_{max}$ is made possible since the calibration of the detector 2 is the same for the two energies of both the radiation $3_{min}$ and the radiation $3_{max}$.

As alternative embodiments, measuring the intensity of the ionizing radiation simply involves detecting that the intensity of the ionizing radiation exceeds a predetermined threshold.

Other Alternative Embodiments:

The description provided in the particular case where the ionizing radiation is an X-ray, applies to any type of ionizing radiation. For example, the description provided herein can be adapted to gamma ray or to radiation of charged particles or neutrons. Since neutrons are not charged, they do not directly produce ionizations by traversing the material. However, the neutrons cause, by traversing the amplifying material, nuclear reactions, which generate ionizing radiation. Thus, the neutrons are indirectly ionizing since it is the fact that they are captured by the nuclei or that they interact therewith that generates gamma rays and/or various ionizing particles. For this reason, neutron radiation is considered herein to be ionizing radiation. The charged particle radiation is, for example, alpha, beta+, beta– particle radiation, any type of ions, for example, carbon or proton ions. In these cases, the amplifying material and/or the transducing material 30 must be adapted to the incident ionizing radiation. More specifically, the amplifying material must generate, in response to the incident ionizing radiation, secondary radiation able to excite the transducing material. Thus, the transducing material itself does not need to be directly excitable by the primary ionizing radiation. In fact, it simply needs to be sensitive to the secondary ionizing radiation generated by the thickness of amplifying material. By way of an illustration, in the case where the primary ionizing radiation is a high-energy gamma ray, it is possible to select a luminescent material that is only sensitive to X-rays. In this case, the amplifying material is a material that generates radiation with lower energies when it is exposed to the high-energy gamma ray. This latter embodiment is even advantageous in the case where several sensitive parts of several detectors are located next to one another because it limits any interference between these different sensitive parts.

In response to its exposure to the primary or secondary ionizing radiation, the transducing material can also emit a lower energy ionizing radiation which excites itself.

By way of an illustration and in order to limit the thickness $e_m$, when the primary ionizing radiation is a high-energy electron beam, the amplifying material is selected as described above in the case where the primary ionizing radiation is a high-energy X-ray. For example, the amplifying material is lead in this case. When the primary ionizing radiation is an ion beam, such as, for example, carbon ions, with very high energy, i.e., the energy of which ranges, for example, between 1 MeV and 50 MeV, preferably, the amplifying material that is selected is slightly lighter. For example, the amplifying material selected in this case is aluminum. Indeed, a lead thickness of 500 μm can significantly attenuate the primary ionizing radiation in such a case. The amplification principle is the same, but the selected amplifying material must be adapted to the radiated particles.

The description provided herein also applies to the case where the primary ionizing radiation is a low-energy ionizing radiation. In this latter case, the secondary ionizing radiation is generally lower energy X-rays or electrons.

Chapter III: Advantages of the Described Embodiments:

Incident ionizing radiation, especially when it is high energy, reacts with the atoms of the amplifying material in order to generate lower energy secondary ionizing radiation. The secondary ionizing radiation then in turn reacts with the transducing material in order to generate light or electrical charges. Thus, due to the presence of the amplifying layer, the transducing material is exposed to an amount of low-energy ionizing radiation that is greater than when the amplifying layer is absent. It therefore produces a greater amount of light or electrical charges for the same intensity of the primary ionizing radiation than in the absence of this amplifying layer. The sensitivity of the dosimeter is therefore enhanced.

The described manufacturing method allows a detector to be obtained that, like that described in JP 2011/191255 A, has a calibration that hardly varies as a function of the energy of the primary ionizing radiation to be measured from the moment this energy ranges between the values $V_{min}$ and $V_{max}$ taken into account when designing this detector.

Furthermore, for the same range $[V_{min}; V_{max}]$ of constant calibration and when the same heavy materials are used in the detector of JP 2011/191255 and in the detector 2, the detector 2 uses a much lower total thickness $e_T$ of amplifying material. For example, when the detector described in JP 2011/191255 uses gold thicknesses that are several millimeters, the detector 2 only uses a total gold thickness that is less than 1 mm in order to acquire the same range $[V_{min}; V_{max}]$ of constant calibration.

Producing the amplifying layer mainly from heavy material, the atomic number of which is greater than or equal to 74, allows a value of the abscissa $e_m$ to be acquired that is less than 1 mm. This allows the bulk of the sensitive part to be significantly reduced and therefore allows the spatial resolution of the detector 2 to be enhanced.

The fact that the total thickness of amplifying material is less than 1 mm or 600 µm allows a very small footprint to be acquired for the sensitive part of the fiber dosimeter. Under these conditions, the dimensions of the sensitive part remain compatible with endoscopy techniques. For example, it is then possible to place the sensitive part of the fiber dosimeter directly inside the tumor to be irradiated. This thus allows the doses of radiation applied to the tumor to be better controlled.

The fact that the amplifying layer is itself formed by a stack of several sub-layers amplifying atomic numbers that decrease as the transducing material is approached allows the sensitivity of the dosimeter to be enhanced even further compared to the case of a single-layer amplifying layer.

The invention claimed is:

1. A method for manufacturing a detector for detecting the flows of a first and a second incident ionizing radiation that only differ from each other by the fact that the median energies of the ionizing particles in the first and second incident ionizing radiation are equal to a first and to a second value, respectively, with the second value differing from the first value by at least 500 keV, said method comprising:
   acquiring the first and second values separated from each other by at least 500 keV; then
   selecting a total thickness of amplifying material traversed when this detector is exposed to the first and second incident ionizing radiation, with this total thickness of amplifying material being able to generate a lower energy secondary ionizing radiation when it is excited by the first and second incident ionizing radiation, this total thickness being greater than 15 µm; then
   producing a stack comprising, in the direction of propagation of the first and second incident ionizing radiation, the selected total thickness of amplifying material and a thickness of transducing material, with this thickness of transducing material being able to generate photons or electrical charges when it is excited by the secondary ionizing radiation generated by the total thickness of amplifying material;
   connecting a sensor of photons or electrical charges to the produced stack in order to count the number of photons or electrical charges generated per second by the thickness of transducing material,
   wherein selecting the total thickness of amplifying material comprises:
   determining the abscissa $e_m$ of a point of intersection between a first and a second curve, with the first and second curves representing the evolution of the number of photons or electrical charges generated per second by the transducing material as a function of the total thickness of amplifying material when the transducing material is irradiated, through this thickness of transducing material, by the first and second incident ionizing radiation, respectively; then
   selecting the total thickness of amplifying material between 0.9 $e_m$ and 1.1 $e_m$.

2. The method as claimed in claim 1, wherein the method comprises selecting the one or more amplifying materials used to produce 70% of the thickness of amplifying material in the group made up of gold (Au), lead (Pb) and tungsten (W).

3. The method as claimed in claim 1, wherein the production of the stack is selected from the group made up of:
   producing a stack comprising a single amplifying layer made of amplifying material and a single layer of transducing material, with the thickness of the single amplifying layer ranging between 0.9 $e_m$ and 1.1 $e_m$; and
   producing a stack comprising only a first and a second amplifying layer made of amplifying material and a single layer of transducing material interposed between the first and second amplifying layers, with the sum of the thicknesses of the first and second amplifying layers ranging between 0.9 $e_m$ and 1.1 $e_m$.

4. The method as claimed in claim 1 wherein the first value is less than 2.5 MeV and the second value is greater than 4 MeV.

5. The method as claimed in claim 4, wherein the first and second values are equal to 500 keV and 10 MeV, respectively.

6. A method for measuring flows of incident ionizing radiation, said method comprising a step of measuring, using the same detector, flows of multiple incident ionizing radiation levels successively emitted one after the other, with the median energies of the ionizing particles of these incident ionizing radiation levels to be measured varying between a minimum value and a maximum value, with the minimum and maximum values being spaced apart by at least 500 keV;
   wherein the detector used to measure the flows of these incident ionizing radiation levels comprises:
   a single stack containing, in a direction of propagation of the incident ionizing radiation, a total thickness $e_T$ of amplifying material and a thickness of a transducing material traversed by the incident ionizing radiation to be measured,
   with the thickness of transducing material being able to generate photons or electrical charges when it is excited by a lower energy secondary ionizing radiation than the energy of the incident ionizing radiation to be measured that is currently emitted,
   with the total thickness of amplifying material being able to generate this lower energy secondary ionizing radiation when it is excited by the incident ionizing radiation to be measured that is currently emitted, this total thickness $e_T$ being greater than 15 µm; and a sensor for photons or electrical charges connected to the stack for counting the number of photons or electrical charges generated per second by the thickness of transducing material, wherein the total thickness $e_T$ of amplifying material of the detector used to measure the flows of these incident ionizing radiation levels ranges between 0.9 $e_m$ and 1.1 $e_m$, where the thickness $e_m$ is the total thickness of amplifying material for which the numbers of photons or electrical charges generated per second by the thickness of transducing material when the stack is irradiated by first and second incident ionizing radiation, respectively, are equal, with this first and second incident ionizing radiation being equal to the ionizing radiation for which the median energies of the ionizing particles are equal to said minimum and maximum values, respectively, implemented during the measurement step.

7. The method as claimed in claim 6, wherein the stack of the detector, used to measure the flows of incident ionizing radiation, belongs to the group made up of:
   a stack comprising a single amplifying layer made of amplifying material and a single layer of transducing material, with the thickness of the single amplifying layer ranging between 0.9 $e_m$ and 1.1 $e_m$; and
   a stack comprising only a first and a second amplifying layer made of amplifying material and a single layer of transducing material interposed between the first and second amplifying layers, with the sum of the thicknesses of the first and second amplifying layers ranging between 0.9 $e_m$ and 1.1 $e_m$.

8. A detector for detecting the flows of a first and a second incident ionizing radiation that differ from each other only by the fact that the median energies of the ionizing particles in the first and second incident ionizing radiation are equal to a first and a second value, respectively, with the first and second values being selected from the group made up of:
   a first value equal to 100 keV and a second value equal to 600 keV;
   a first value equal to 2 MeV and a second value equal to 4.5 MeV;
   a first value equal to 500 keV and a second value equal to 10 MeV;
   a first value equal to 25 MeV and a second value equal to 50 MeV; and
   a first value equal to 230 MeV and of a second value equal to 250 MeV;

said detector comprising:
   a single stack containing, in a direction of propagation of the first and second incident ionizing radiation, a total thickness $e_T$ of amplifying material and a thickness of a transducing material traversed by the first and second incident ionizing radiation to be measured, with the thickness of transducing material being able to generate photons or electrical charges when it is excited by lower energy secondary ionizing radiation than the energy of the first and second incident ionizing radiation, with the total thickness of amplifying material being able to generate this lower energy secondary ionizing radiation when it is excited by the first and second incident ionizing radiation, this total thickness $e_T$ being greater than 15 µm; and a sensor for photons or electrical charges connected to the stack for counting the number of photons or electrical charges generated per second by the thickness of transducing material, wherein the total thickness of amplifying material ranges between 0.9 $e_m$ and 1.1 $e_m$, where the thickness $e_m$ is the total thickness of amplifying material for which the numbers of photons or electrical charges generated per second by the thickness of transducing material when the stack is irradiated by the first and second incident ionizing radiation, respectively, are equal.

9. The device as claimed in claim 8, wherein the stack is selected from the group made up of:
   a stack comprising a single amplifying layer made of amplifying material and a single layer of transducing material, with the thickness of the single amplifying layer ranging between 0.9 $e_m$ and 1.1 $e_m$; and
   a stack comprising only a first and a second amplifying layer made of amplifying material and a single layer of transducing material interposed between the first and second amplifying layers, with the sum of the thicknesses of the first and second amplifying layers ranging between 0.9 $e_m$ and 1.1 $e_m$.

10. The detector as claimed in claim 9, wherein:
    the sensor is a photon sensor;
    the detector comprises an optical fiber comprising a core able to guide light, with this optical fiber connecting the transducing material to the sensor; and
    the transducing material is a luminescent material able, when it is excited by the secondary ionizing radiation, to generate the light guided by the core of the optical fiber.

11. The detector as claimed in claim 8, wherein 70%, by mass, of the one or more amplifying materials used to produce the total thickness of amplifying material is selected from the group made up of gold (Au), lead (Pb) and tungsten (W) and the thickness $e_m$ is less than 1 mm.

12. The detector as claimed in claim 11, wherein:
    the sensor is a photon sensor;
    the detector comprises an optical fiber comprising a core able to guide light, with this optical fiber connecting the transducing material to the sensor; and
    the transducing material is a luminescent material able, when it is excited by the secondary ionizing radiation, to generate the light guided by the core of the optical fiber.

* * * * *